United States Patent
Mao et al.

(10) Patent No.: US 8,659,580 B2
(45) Date of Patent: Feb. 25, 2014

(54) ELECTROMAGNETIC PEN WITHOUT A BATTERY

(75) Inventors: Chung-Fuu Mao, Hsin-Chu (TW); Chia-Jui Yeh, Taipei (TD)

(73) Assignee: Waltop International Corporation, Hsinchu (TW)

( * ) Notice: Subject to any disclaimer, the term of this patent is extended or adjusted under 35 U.S.C. 154(b) by 484 days.

(21) Appl. No.: 12/796,202

(22) Filed: Jun. 8, 2010

(65) Prior Publication Data

US 2011/0297458 A1    Dec. 8, 2011

(51) Int. Cl.
  *G06F 3/033*    (2013.01)
(52) U.S. Cl.
  USPC .......................................................... 345/179
(58) Field of Classification Search
  USPC .......................................................... 345/179
  See application file for complete search history.

(56) References Cited

U.S. PATENT DOCUMENTS

| | | | | |
|---|---|---|---|---|
| 5,430,376 A | * | 7/1995 | Viertl | 324/227 |
| 5,528,002 A | * | 6/1996 | Katabami | 178/19.06 |
| 2004/0125089 A1 | * | 7/2004 | Chao et al. | 345/179 |
| 2008/0099254 A1 | * | 5/2008 | Katsurahira | 178/18.01 |
| 2008/0150914 A1 | * | 6/2008 | Yamamoto | 345/175 |
| 2008/0150918 A1 | * | 6/2008 | Hagen et al. | 345/179 |
| 2008/0223925 A1 | * | 9/2008 | Saito et al. | 235/380 |
| 2010/0207607 A1 | * | 8/2010 | Katsurahira et al. | 324/207.11 |

FOREIGN PATENT DOCUMENTS

CN    201435623    3/2010

* cited by examiner

*Primary Examiner* — Chanh Nguyen
*Assistant Examiner* — Long D Pham
(74) *Attorney, Agent, or Firm* — Muncy, Geissler, Olds & Lowe, PLLC

(57) ABSTRACT

The present invention relates to a new electromagnetic pen without a battery, and particularly relates to a new electromagnetic pen without a battery, which has two coils inside. An oscillator circuit and a resonance circuit are formed in the new electromagnetic pen respectively by the two coils. The oscillator circuit is formed for emitting electromagnetic signals to a tablet, and the resonance circuit is formed for receiving the electromagnetic energy emitted from the tablet. Therefore, unlike the conventional electromagnetic pen without a battery, which only receive the electromagnetic energy and emit the electromagnetic signals in a short period, the new electromagnetic pen of this invention can receive the electromagnetic energy emitted from the tablet continuously, so the oscillator circuit can emit the electromagnetic signals to the tablet continuously.

18 Claims, 3 Drawing Sheets

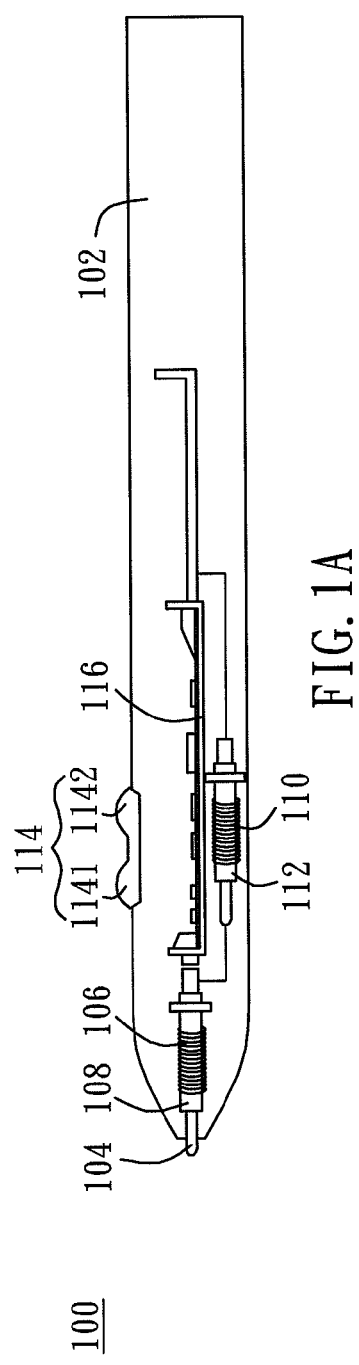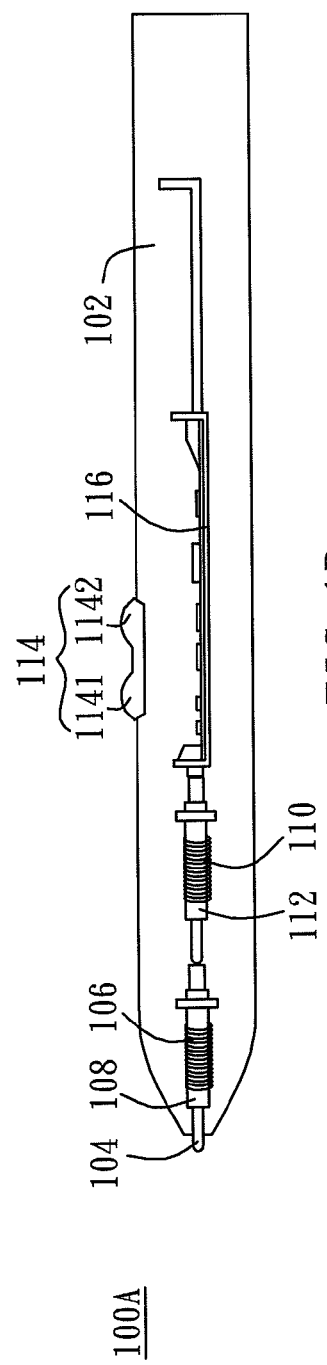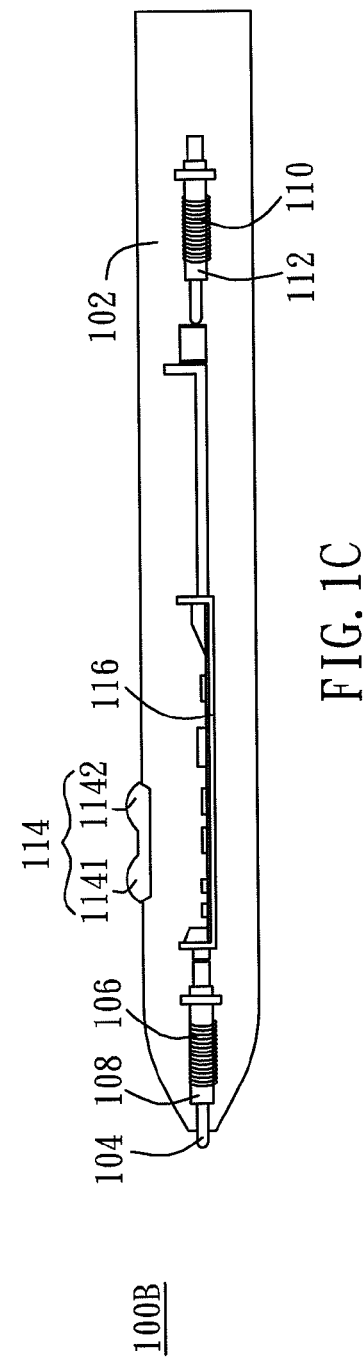

ELECTROMAGNETIC PEN WITHOUT A BATTERY

FIELD OF THE INVENTION

The present invention relates to a new electromagnetic pen without a battery, and particularly relates to a new electromagnetic pen without a battery, which has two coils inside.

BACKGROUND OF THE INVENTION

An electromagnetic hand writing input device (or a hand writing system tablet) is typically used by a user with a tablet and an electromagnetic pen-type stylus (after, saying electromagnetic pen). The conventional electromagnetic pens are classified into the electromagnetic pen with a battery and the electromagnetic pen without a battery according to the methods of providing power. In the electromagnetic pen with a battery, a battery is provided to be the power source of this electromagnetic pen. The oscillator circuit in this electromagnetic pen with a battery actively emits the electromagnetic signals by the power provided by the battery. It is so-called active type electromagnetic pen. The electromagnetic pen with a battery has following advantages: (1) No matter the electromagnetic pen is near the tablet or away from the tablet, the electromagnetic pen can emit the electromagnetic signal with special frequency continuously. (2) No matter the electromagnetic pen is near the tablet or away from the tablet, the intensity of the electromagnetic signal emitted from the electromagnetic pen is maintained. (3) The intensity of the electromagnetic signal emitted from the electromagnetic pen is stronger as a result of the enough power provided by the battery.

However, the electromagnetic pen has a drawback of heavy weight. As a result that the electromagnetic pen has a need of a battery put in the body of the electromagnetic pen, for example a AAA size alkaline battery, the weight of the electromagnetic pen is increased because of the battery. Therefore, it is inconvenient for the user to operate and carry.

In the electromagnetic pen without a battery, there is no any battery existing in the electromagnetic pen for providing power to the electromagnetic pen. Instead, a LC resonance circuit is provided in the electromagnetic pen for receiving energy from the tablet. The LC resonance circuit resonates with the AC electromagnetic signal emitted from the tablet, and it receives electromagnetic energy and store energy in the oscillator circuit. After tablet stop sending energy, the electromagnetic pen begins to emit electromagnetic signal to the tablet by using the same LC resonance circuit with energy it stored. Therefore, this electromagnetic pen receives the electromagnetic signal and emits the electromagnetic signal by the same resonance circuit in this electromagnetic pen. However, the electromagnetic pen without a battery has only advantage of low weight, but it has many disadvantages as following: (1) The electromagnetic pen cannot receive enough electromagnetic energy and cannot emit the electromagnetic signal when the electromagnetic pen moves away from the tablet. (2) The intensity of the electromagnetic signal cannot be maintained, because the longer distance between the electromagnetic pen and the tablet, the less electromagnetic energy the electromagnetic pen can receive. Therefore, if electromagnetic energy received by the electromagnetic pen is not enough, the intensity of the electromagnetic signal, which is emitted from the electromagnetic pen to the tablet, is getting weaker. This electromagnetic pen only can emit the electromagnetic signal at a short time period because the electromagnetic pen only can store little energy. And during the period for emitting the electromagnetic signal, the intensity of the electromagnetic signal is getting weaker quickly because the power stored in the electromagnetic pen is reduced quickly. Therefore, the electromagnetic pen cannot emit the electromagnetic signal continuously and the intensity of the electromagnetic signal cannot be maintained in the period. (3) As a result that the electromagnetic pen only can store little power, the electromagnetic signal emitted by the electromagnetic pen is weak and it is easy to be interfered by the noises in the environment.

In recent years, there are some long-lasting batteries, for example a lithium battery, some rechargeable batteries which can be used repeatedly, and super capacitors have been developed instead of the dry battery in the electromagnetic pen with a battery. However, it has a need of rechargeable function in these designs of these electromagnetic pens, and it has a need of adding some extra components to the electromagnetic pens, for example a power managing unit, a recharging contact, and a recharging circuit, or some components which people can get easily, for example a super capacitor, in these electromagnetic pens. Therefore, the structures of these electromagnetic are complicated and the difficulty and cost for fabricating these electromagnetic are increased instead. However, even these designs are adopted, the weights of these electromagnetic pens cannot reduced substantially.

Therefore, in view of foregoing drawbacks of the conventional electromagnetic pens, there is a need to provide a new electromagnetic pen having characteristics of simple structure, low cost and low weight, and having advantages of both of the electromagnetic pen with a battery and the electromagnetic pen without a battery. It has no need to use a battery as a power source of the electromagnetic pen and it does not have the drawbacks of the electromagnetic pen without a battery.

SUMMARY OF THE INVENTION

An objective of this invention is to provide a new electromagnetic pen having advantages of both of the electromagnetic pen with a battery and the electromagnetic pen without a battery. It not only has characteristics of simple structure, low cost and low weight and has no need to use a battery as power source of the electromagnetic pen, but the electromagnetic pen does not have the drawbacks of the electromagnetic pen without a battery that the intensity of the electromagnetic signal is getting weaker quickly in a short time and the electromagnetic pen cannot emit the electromagnetic signal continuously.

In one embodiment of the present invention, a new electromagnetic pen having advantages of both of the electromagnetic pen with a battery and the electromagnetic pen without a battery. The new electromagnetic pen comprises a body, a core, a first coil, a second coil and a switch. The core is deposed in the body and one of the two ends of the core protrudes and exposes from the front part of the body for writing, drawing and selecting objects on a tablet. Both of the first coil and the second coil are deposed in the body. The first coil is wound around a first permeability material and deposed on the core for emitting electromagnetic signals to the tablet. The second coil is wound around a second permeability material. The second coil resonates with an electromagnetic energy emitted from the tablet for receiving the electromagnetic energy, and then the electromagnetic energy is transmitted to the first coil for providing power to the first coil to emit electromagnetic signals. The switch is deposed on the body for controlling the frequency of the electromagnetic signal emitted from the first coil.

The new electromagnetic pen has no need of a battery because a resonance circuit for the only purpose of receiving the electromagnetic energy is formed by a second coil which is used for the purposes of receiving and storing the electromagnetic signal (or the electromagnetic energy) emitted from the tablet. There is no need of using the same resonance circuit to emit the electromagnetic signals. Therefore, unlike the conventional electromagnetic pen without a battery, the new electromagnetic pen does not have the drawbacks that the intensity of the electromagnetic signal emitted from the electromagnetic pen is getting weaker quickly and the electromagnetic pen can not emit the electromagnetic signal continuously because the electromagnetic pen receives the electromagnetic energy in a short time period and it only receives little electromagnetic energy.

Therefore, the effect achieved with the present invention is to provide a new electromagnetic pen having advantages of both of the electromagnetic pen with a battery and the electromagnetic pen without a battery and having characteristics of simple structure, low cost and low weight. This new electromagnetic pen can emit the electromagnetic signal continuously and the intensity of the electromagnetic signal emitted from this new electromagnetic pen is not getting weaker quickly in a short time.

BRIEF DESCRIPTION OF THE DRAWINGS

FIGS. 1A, 1B and 1C are stereoscopic form diagrams respectively illustrating new electromagnetic pens in accordance with different embodiments of the present invention.

DESCRIPTION OF THE EXEMPLARY EMBODIMENTS

Figure 2A:
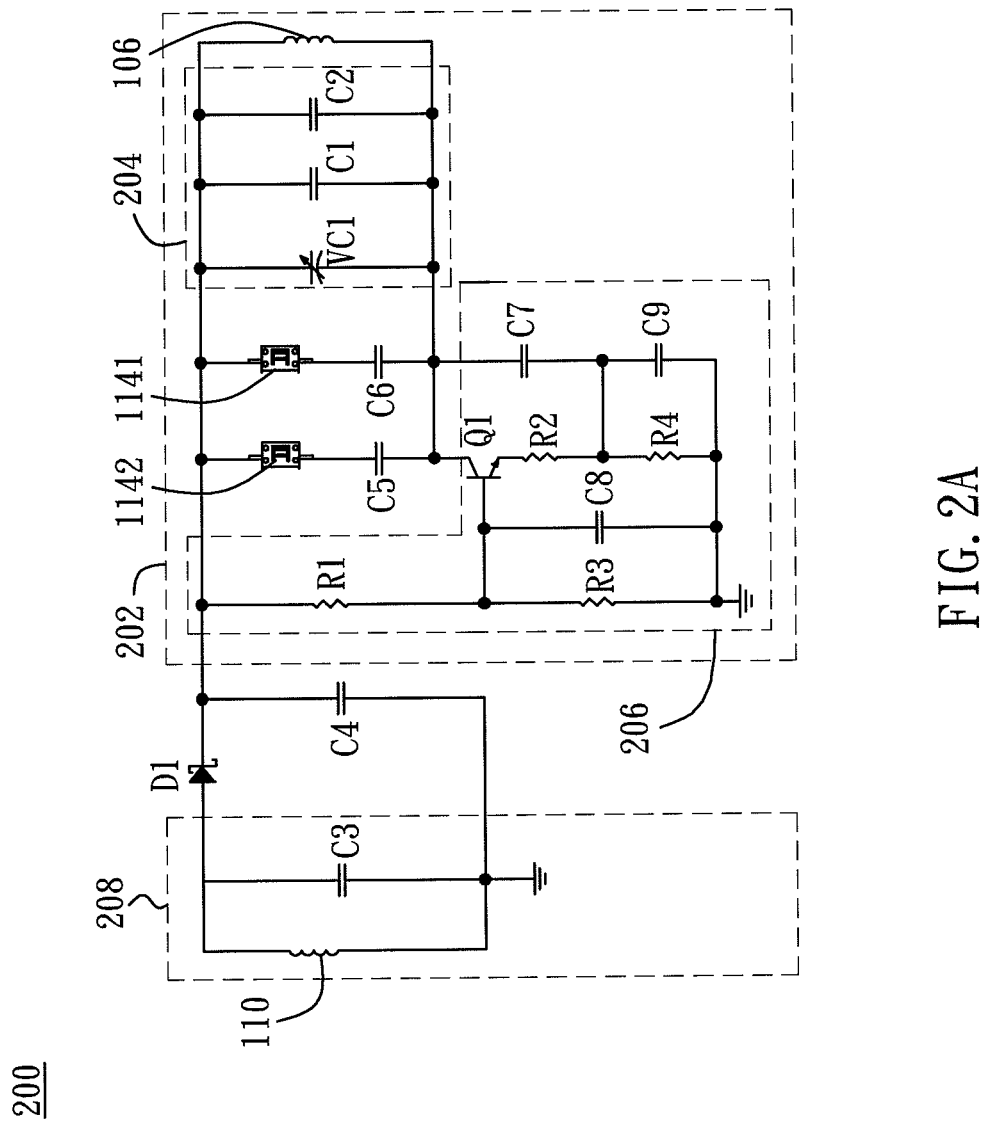
FIG. 2A is a diagram illustrating inner circuit of an electromagnetic pen without a battery in accordance with one embodiment of the present invention.

Although the present invention will be described in accordance with the embodiments shown as following, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Referring to FIG. 1A, it is a stereoscopic form diagram illustrating new electromagnetic pens 100 without a battery in accordance with one embodiment of the present invention. The new electromagnetic pen 100 without a battery comprises a body 102, a core 104, a first coil 106, a second coil 110 and a switch 114. The core 104 is deposed in the body 102. One of the two ends of the core 104 protrudes and exposes from the front part of the body 102 to be the penpoint of the new electromagnetic pen 100 for writing, drawing and selecting objects on a tablet. The first coil 106 is wound around a first permeability material 108, and the first permeability material 108 is deposed on the core 104 (or at one of the two ends of the core 104). Or, the first permeability material 108 is part of the core 104. It means that the core 104 itself is a permeability material and the first coil 106 is directly wound around the core 104. The new electromagnetic pen 100 emits the electromagnetic signals by the first coil 106. The tablet can find position of the new electromagnetic pen 100 and records the position and moving track of the new electromagnetic pen 100 by the electromagnetic signals emitted from the new electromagnetic pen 100. Therefore, the user can write, draw and select objects on the tablet by the new electromagnetic pen 100.

The second coil 110 is wound around a second permeability material 112. The second coil 110 resonates with the electromagnetic energy emitted from the tablet for receiving the electromagnetic energy, and then the energy is transmitted to the first coil 106 for providing power to the first coil 106 to emit electromagnetic signals. The switch 114 is deposed on the surface of the new electromagnetic pen 100, and the switch 114 comprises two side buttons 1141 and 1142 for controlling and changing the frequency of the electromagnetic signal emitted from the first coil 106.

Besides, referring to FIGS. 1A and 2A simultaneously, FIG. 2A is a diagram illustrating inner circuit 200 of an electromagnetic pen 100 without a battery in accordance with one embodiment of the present invention. There is a circuit board 116 deposed in the body 102, and there is a circuit is deposed on the circuit board 116. A series circuit (it means inner circuit 200) of an oscillator 202 and a resonance circuit 208 is formed by the circuit on the circuit board 116, the first coil 106 and the second coil 110. The oscillator circuit is used for emitting the electromagnetic signals and the resonance circuit 208 is used for receiving the electromagnetic energy emitted from the tablet and transforming the electromagnetic energy into the electric power.

The oscillator circuit 202 comprises the first coil 106, an adjusting circuit 204 and a transistor circuit 206 wherein the first 106 and the adjusting circuit 204 are in parallel. The adjusting circuit 204 is deposed between the first coil 106 and the transistor circuit 206 and the adjusting circuit 204 is respectively connected with the first coil 106 and the transistor circuit 206 for adjusting the frequency of the electromagnetic signal emitted from the first coil 106 to get the desired frequency precisely. The transistor circuit 204 is formed by several capacitors C1, C2 and a variable capacitor VC1 wherein they are in parallel. The transistor circuit 206 is formed by a transistor (or IC) Q1, several capacitors C7, C8, C9 and several resistors R1, R2, R3, R4 wherein they are series-parallel connection. The transistor circuit 206 applies the electric power (or the electric current) transmitted from the resonance circuit 208 for forming a feedback oscillation with the first coil 106. The adjusting circuit 204 and the transistor circuit 206 illustrated in FIG. 2A are one embodiment of this invention, but it is not limit. Many modifications of the adjusting circuit and the transistor circuit may be made by one of ordinary skill in the art according to designs and demands.

Furthermore, the oscillator circuit 202 further comprises two capacitors C5 and C6 which are in parallel, and the capacitor C5, the capacitor C6, the first coil 106 and the adjusting circuit 204 are in parallel, too. The capacitors C5 and C6 are respectively connected with the side buttons 1141 and 1142. It means that each of the side buttons 1141, 1142 is corresponded to one of the capacitors C5, C6 and the corresponded capacitor C5, C6 is deposed in the oscillator circuit 202. By pressing or turning on the side buttons 1141, 1142, the capacitors C5, C6 corresponded to the side buttons 1141, 1142 are controlled to join the operation of the oscillator circuit 202 or to work with the oscillator circuit 202 for controlling and changing the frequency of the electromagnetic signals emitted from the oscillator circuit 202. Many kinds of the oscillator circuits can be adopted in this invention, for example Hartley oscillator circuit, Colpitts oscillator circuit, Clapp oscillator circuit, or Wien bridge oscillator circuit.

The resonance circuit 208 comprises the second coil 110 and a capacitor C3 wherein the capacitor C3 and the second coil 110 are in parallel. The capacitor C3 is used to provisionally store the electromagnetic energy received by the second coil 110. Furthermore, there is a voltage regulator unit C4 deposed between the resonance circuit 208 and the oscillator circuit 202 for storing the electric power which is transformed from the electromagnetic energy received by the resonance circuit 208 and is rectified by the rectifier unit D1. The stored electric power in the voltage regulator unit C4 is provided to the oscillator circuit 202 to emit the electromagnetic signals. One end of the voltage regulator unit C4 is connected with the resonance circuit 208 and the voltage regulator unit C4 is connected with the oscillator circuit 202, too. There is a rectifier unit D1 deposed between another end of the voltage regulator unit C4 and resonance circuit 208. The rectifier unit D1 is used to half-wave rectify the electric power which is transmitted from the resonance circuit 208 to the voltage regulator unit C4, and then the rectified electric power is transmitted to the voltage regulator unit C4 for storing. The voltage regulator unit C4 is a capacitor, and the rectifier unit D1 is a Diode Schottky. The resonance circuit 208 is a LC resonance circuit.

In the new electromagnetic pen 100 without a battery, the resonance circuit 208 resonates with the electromagnetic energy emitted from the tablet by the second coil 110, and then it receives and collects the electromagnetic energy emitted from the tablet. After the power collected by the resonance circuit 208 is rectified by the rectifier unit D1 made of a diode, it is transmitted to the voltage regulator unit C4 for storing. When the new electromagnetic pen 100 emits the electromagnetic signal to the tablet, the electric power stored in the voltage regulator unit C4 is transmitted to the oscillator circuit 202. After the electric power is provided to the transistor circuit 206, the adjusting circuit 204 adjusts the frequency of the electromagnetic signal to get the desired frequency precisely, the first coil 106 emits the adjusted electromagnetic signal. At the same time, the capacitor C5, C6 is controlled to join the operation of the oscillator circuit 202 or to work with the oscillator circuit 202 by pressing the side button 1141, 1142 of the switch 114 to change the frequency of the electromagnetic signal emitted from the first coil 106. Therefore, the function or the working mode of the new electromagnetic pen 100 is changed by this way.

Therefore, the new electromagnetic pen applied a resonance circuit 208 for the only purpose of receiving and collecting the electromagnetic energy emitted from the tablet. The resonance circuit 208 is applied instead of the battery of the conventional electromagnetic pen with a battery for being a power source of the electromagnetic pen. Therefore, the new electromagnetic pen 100 has the advantage of low weight as the conventional electromagnetic pen without a battery. As a result that the resonance circuit 208 is applied only for the purpose of receiving the electromagnetic signal and it is not applied to emit the electromagnetic signal, the resonance circuit 208 can receive the electromagnetic energy continuously when the tablet emits the electromagnetic signal continuously. The electromagnetic energy received by the resonance circuit 208 can be transformed into the electric power to store in the voltage regulator unit C4 by the resonance circuit 208 continuously. Therefore, the resonance circuit 208 can continuously provide enough electric energy to the oscillator circuit 202 for emitting the electromagnetic signals, and the intensity of the electromagnetic signal emitted from the new electromagnetic pen 100 is not getting weaker quickly in a short time. However, the conventional electromagnetic pen without a battery only can receive the electromagnetic energy in a short time period and then it need to transmit the electromagnetic signal back to the tablet immediately because the conventional electromagnetic pen without a battery applies the same LC resonance circuit to receive the electromagnetic energy emitted from the tablet and to emit the electromagnetic signal back to tablet. Therefore, the electromagnetic energy received by the LC resonance circuit is not enough for the conventional electromagnetic pen without a battery to emit the electromagnetic signal continuously and the intensity of the electromagnetic signal emitted from this conventional electromagnetic pen is getting weaker quickly in a short time because it can not receive enough electromagnetic energy. Therefore, unlike the conventional electromagnetic pen without a battery, the new electromagnetic pen 100 does not have the problems about that it cannot emit the electromagnetic signal continuously and the intensity of the emitted electromagnetic signal is getting weaker quickly in a short time.

Besides, in the new electromagnetic pen 100, the oscillator circuit 202 is applied instead of the LC resonance circuit of the conventional electromagnetic pen without a battery, which is used to receive the electromagnetic energy and to emit the electromagnetic signal simultaneously, for emitting the electromagnetic signal to the tablet. In the new electromagnetic pen 100 without a battery, feedback oscillation and frequency adjusting are performed by the transistor circuit 206 and the adjusting circuit 204 of the oscillator circuit 202. Therefore, the electromagnetic pen 100 can emit the stable and precise electromagnetic signal but it does not have the drawback of low stability of the electromagnetic signal as the conventional electromagnetic pen without a battery has There is no any extra components is added in the new electromagnetic pen 100 without a battery. For example, it doesn't need the power managing unit, recharging contact, and recharging circuit. And it has no any components which people cannot get easily, for example a super capacitor. That means the drawbacks of the conventional rechargeable battery-free electromagnetic pen can be overcame. Therefore, the structure of the new electromagnetic pen 100 can be simplified, and the difficulty and the cost for fabricating the new electromagnetic pen 100 can be reduced.

Figure 2B:
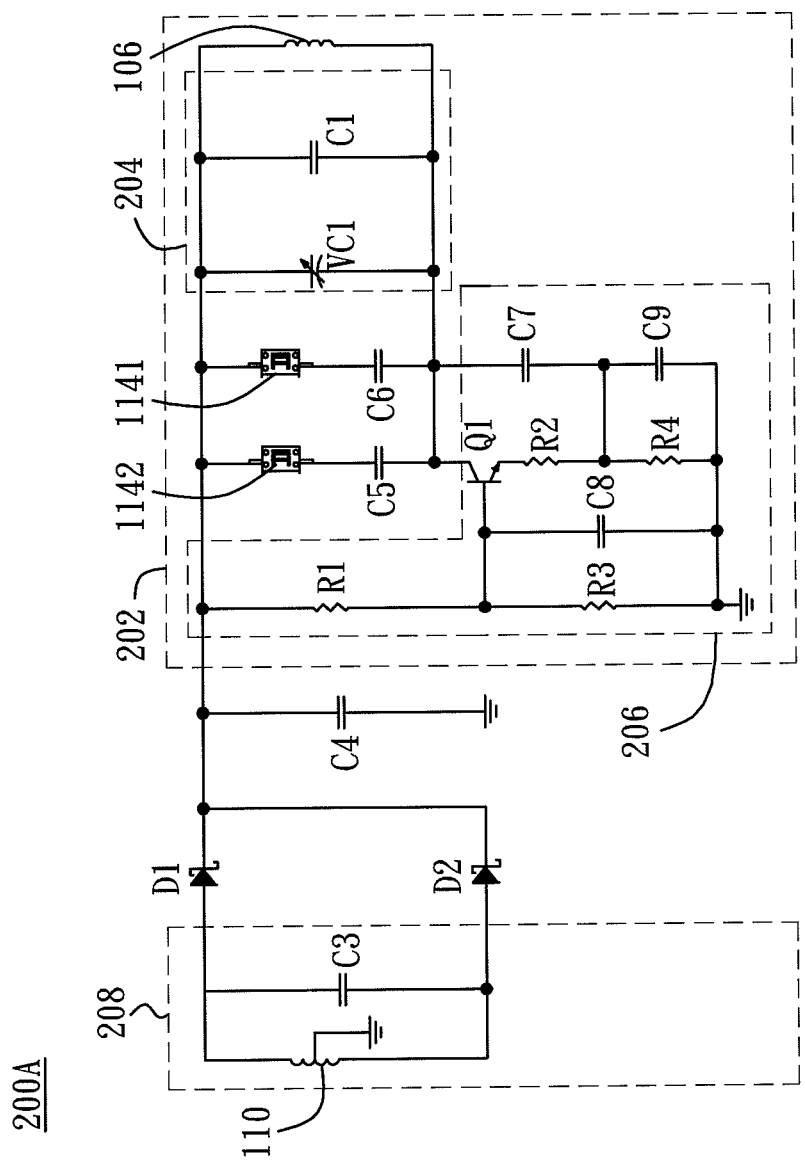
FIG. 2B is a diagram illustrating inner circuit of an electromagnetic pen without a battery in accordance with another embodiment of the present invention.

Furthermore, not only the half-wave rectification technology can be applied to the new electromagnetic pen without a battery of this invention, but the full-wave rectification technology also can be applied to the new electromagnetic pen without a battery of this invention. Referring to FIGS. 1A and 2B simultaneously, it is a diagram illustrating inner circuit 200A of the electromagnetic pen 100 without a battery in accordance with another embodiment of the present invention. The inner circuit 200A is the similar to the inner circuit 200. Similarly, the inner circuit 200A comprises an oscillator circuit 202, a voltage regulator unit C4 and a resonance circuit 208. The voltage regulator unit C4 is deposed between the oscillator circuit 202 and the resonance circuit 208. Both of the oscillator circuits 202 of the inner circuits 200A and 200 comprise the first coil 106, the adjusting circuit 204 which is formed by the capacitor C1 and the variable capacitor VC1 in parallel, the transistor circuit 206 which is formed by transistor (or IC) Q1, several capacitors C7, C8, C9 and several resistors R1, R2, R3, R4 in parallel and in series, and the capacitors C6 and C5 respectively corresponded to the side buttons 1141 and 1142. Both of the resonance circuits 208 of the inner circuits 200A and 200 are the LC resonance circuits which are formed by the second coils 110 and the capacitors C3 in parallel.

However, the difference between the inner circuits 200A and 200 is that the second coil of the inner circuit 200A is wound by midpoint tap. In the inner circuit 200A, the two ends of the resonance circuit 208 are connected with the rectifier D1 and the rectifier D2. The electric power transmitted from the resonance circuit 208 is full-wave rectified previously and then it is transmitted to the voltage regulator unit C4. Therefore, the new electromagnetic pen 100 without a battery can adopt the full-wave rectification technology by applying the inner circuit 200A in the electromagnetic pen 100 without a battery.

Furthermore, although the second coil 110 is deposed under the circuit board 116 in the electromagnetic pen 100 illustrated in FIG. 1A, but it is not limit In another embodiment of this invention, the second coil 110 is deposed in the space above the circuit board 116 or in the space beside the circuit board 116. Or, as the new electromagnetic pen 100A illustrated in FIG. 1B, the second coil 110 is directly deposed behind the first coil 106 and it means that the second coil 110 is deposed between the first coil 106 and the circuit board 116. Or, as the new electromagnetic magnetic pen 100B without a battery illustrated in FIG. 1C, the second coil 110 is deposed behind the circuit board 116 and it means that the circuit board 116 is deposed between the first coil 106 and the second coil 110. In FIG. 1C, the distance between the second coil 110 and the tablet is increased because of this structure. It is because the new electromagnetic pen 100B contacts or touches the tablet by it's penpoint when the user use the new electromagnetic pen 100B to write, draw or select on the tablet. In consequence of the structure of the new electromagnetic pen 100B, the induction and the resonance between the second coil 110 and the electromagnetic energy emitted from the tablet get weaker, and the efficiency of receiving the electromagnetic energy by the resonance circuit, which is formed by the second 110, gets worse. Therefore, for offsetting the loss the efficiency and for enhancing the second coil 110 to efficiently receive the electromagnetic energy emitted from the tablet when the second coil 110 is away from the tablet, it has a need of a wire having low internal resistance for winding around the second permeability material 112 to for the second coil 110, for example a lacquered strand wire, and it also has a need to increase the circles of the second coil 110 wound around the second permeability material 112. In some embodiments of this invention, the circles of the second coil 110 wound around the second permeability material 112 are greater than the circles of the first coil 106 wound around the first permeability material 108. Furthermore, for further offsetting the loss the efficiency and for enhancing the efficiency of receiving the electromagnetic energy emitted from the tablet, there is a need that a permeability material having good permeability is applied to formed the second permeability material 112, for example Mn—Zn ferrite.

Therefore, a new electromagnetic pen without a battery, which has both of advantages of the conventional electromagnetic pen with a battery and the conventional electromagnetic pen without a battery. This new electromagnetic pen has characteristics of simple structure, low cost and low weight. Furthermore, the new electromagnetic pen can emit the electromagnetic signals continuously but the intensity of the electromagnetic signals emitted from the new electromagnetic pen cannot get weaker.

What is claimed is:

1. A new electromagnetic pen without a battery, comprising:
    a body;
    a core disposed in said body wherein one end of said core protrudes and exposes from a front part of said body for writing, drawing or selecting an object on a tablet;
    a first coil wound around a first permeability material and disposed on said core for emitting electromagnetic signals to the tablet;
    an oscillator circuit wherein said oscillator circuit comprises:
    said first coil;
    an adjusting circuit for adjusting the frequency of the electromagnetic signal emitted from said first coil to get the desired frequency precisely wherein said adjusting circuit and said first coil are in parallel and said adjusting circuit is formed by several capacitors and a variable capacitor wherein they are in parallel; and
    a transistor circuit for forming a feedback oscillation with said first coil wherein said adjusting circuit is disposed between said first coil and said transistor circuit and said transistor circuit is formed by a transistor, several capacitors, and several resistors wherein they are series-parallel connection;
    a second coil wound around a second permeability material wherein said second coil resonates with a electromagnetic energy emitted from the tablet for receiving the electromagnetic energy and then the electromagnetic energy is transmitted to said first coil for providing power to said first coil to emit electromagnetic signals; and
    a switch disposed on said body for controlling the frequency of the electromagnetic signal emitted from said first coil.

2. The new electromagnetic pen without a battery of claim 1, wherein there is a circuit board disposed in said body.

3. The new electromagnetic pen without a battery of claim 2, wherein said oscillator circuit disposed on said circuit board.

4. The new electromagnetic pen without a battery of claim 3, wherein said switch comprises two side buttons, and each of said side buttons has a capacitor which is disposed in said oscillator circuit and corresponded to said side button.

5. The new electromagnetic pen without a battery of claim 4, wherein each of said side buttons is connected with said corresponded capacitor, and said corresponded capacitor and said first coil are in series, and said corresponded capacitor is controlled to work with said oscillator circuit by pressing and turning on said side button.

6. The new electromagnetic pen without a battery of claim 2, wherein there is a resonance circuit disposed on said circuit board for resonating with the electromagnetic signal emitted from the tablet to receive the electromagnetic energy emitted from the tablet and transform the electromagnetic energy into electric energy.

7. The new electromagnetic pen without a battery of claim 6, wherein said resonance circuit comprises:
    said second coil;
    an capacitor for storing the electromagnetic energy received by said second coil wherein said capacitor and said second coil are in parallel.

8. The new electromagnetic pen without a battery of claim 7, wherein there is a voltage regulator unit disposed between said resonance circuit and said oscillator circuit for storing the electric power which is transformed from the electromagnetic energy received by said resonance circuit.

9. The new electromagnetic pen without a battery of claim 8, wherein said voltage regulator unit is a capacitor.

10. The new electromagnetic pen without a battery of claim 8, wherein there is at least one rectifier unit disposed between said resonance circuit and said voltage regulator for rectifying the electric power which is transmitted to said voltage regulator unit by said resonance circuit.

11. The new electromagnetic pen without a battery of claim 10, wherein said rectifier unit is a Diode Schottky.

12. The new electromagnetic pen without a battery of claim 10, wherein one end of said voltage regulator unit is connected with said resonance circuit and said rectifier unit is disposed between another end of said voltage regulator unit and said resonance circuit.

13. The new electromagnetic pen without a battery of claim 10, wherein one end of said voltage regulator unit is connected with said resonance circuit and another end of said voltage regulator unit is connected with a ground for forming said a series connection of said voltage regulator unit and said resonance circuit, and there is one rectifier unit disposed at each of two ends of said resonance circuit respectively.

14. The new electromagnetic pen without a battery of claim 2, wherein said second coil is disposed above or under said circuit board.

15. The new electromagnetic pen without a battery of claim 2, wherein said second coil is disposed between said circuit board and said first coil.

16. The new electromagnetic pen without a battery of claim 2, wherein said circuit board is disposed between said first coil and said second coil.

17. The new electromagnetic pen without a battery of claim 16, wherein a wire having low internal resistance is wound around a permeability material with more circles to form said second coil for enabling said second coil to efficiently receive the electromagnetic energy emitted from the tablet when said second coil is away from the tablet.

18. The new electromagnetic pen without a battery of claim 16, wherein said permeability material is made of Mn—Zn ferrite which has good permeability for enhancing the efficiency for receiving the electromagnetic energy emitted from the tablet.

* * * * *